US010400953B2

(12) United States Patent
Jin et al.

(10) Patent No.: US 10,400,953 B2
(45) Date of Patent: Sep. 3, 2019

(54) PUMP TOWER OF LIQUEFIED GAS STORAGE TANK

(71) Applicant: KC LNG Tech Co., Ltd., Busan (KR)

(72) Inventors: Kyo Kook Jin, Incheon (KR); Ihn Soo Yoon, Incheon (KR); Byung Taek Oh, Incheon (KR); Young Chul Yang, Gunpo-si (KR); Young Soon Sohn, Incheon (KR)

(73) Assignee: KC LNG Tech Co., Ltd., Busan (KR)

( * ) Notice: Subject to any disclaimer, the term of this patent is extended or adjusted under 35 U.S.C. 154(b) by 294 days.

(21) Appl. No.: 15/502,174

(22) PCT Filed: Aug. 6, 2015

(86) PCT No.: PCT/KR2015/008233
§ 371 (c)(1),
(2) Date: Feb. 6, 2017

(87) PCT Pub. No.: WO2016/021950
PCT Pub. Date: Feb. 11, 2016

(65) Prior Publication Data

US 2017/0219166 A1 Aug. 3, 2017

(30) Foreign Application Priority Data

Aug. 6, 2014 (KR) ........................ 10-2014-0101188

(51) Int. Cl.
*F17C 3/02* (2006.01)
*B63B 25/16* (2006.01)
(Continued)

(52) U.S. Cl.
CPC .............. *F17C 3/022* (2013.01); *B63B 25/16* (2013.01); *B63B 27/24* (2013.01); *E04H 7/02* (2013.01);
(Continued)

(58) Field of Classification Search
CPC ........ F17C 2270/011; F17C 2203/0333; F17C 2203/0629; F17C 2221/033;
(Continued)

(56) References Cited

U.S. PATENT DOCUMENTS 3,459,148 A * 8/1969 Eickemeyer ............ B63B 25/16 114/74 A
4,394,931 A 7/1983 Cotgreave et al.
(Continued)

FOREIGN PATENT DOCUMENTS

JP S50-122314 U1 3/1975
JP H07-061393 A 3/1995
(Continued)

OTHER PUBLICATIONS

Office Action of corresponding Japanese Patent Application No. 2017-506932—2 pages, (dated Apr. 19, 2018).
(Continued)

*Primary Examiner* — Ana M Vazquez
(74) *Attorney, Agent, or Firm* — Knobbe Martens Olson & Bear LLP

(57) ABSTRACT

Disclosed is a pump tower disposed inside a liquefied gas storage tank so as to supply or discharge liquefied gas to/from the inside of the liquefied gas storage tank. The pump tower includes a discharge pipe for discharging the liquefied gas in the liquefied gas storage tank, an emergency pipe equipped with an emergency pump at the lower end thereof, and a charge pipe for supplying the liquefied gas into the liquefied gas storage tank. The pump tower further includes a support provided on the bottom of the liquefied gas storage tank for enabling the vertical displacement of the pump tower and restricting the horizontal movement and rotation thereof. The support includes a lower body fixed to a hull side, an upper body fixed to a pump tower side and a
(Continued)

wedge member interposed between the lower body and the upper body.

22 Claims, 12 Drawing Sheets

(51) Int. Cl.

| | |
|---|---|
| ***B63B 27/24*** | (2006.01) |
| ***F04B 15/00*** | (2006.01) |
| ***F17C 13/00*** | (2006.01) |
| ***E04H 7/02*** | (2006.01) |
| ***F04B 15/08*** | (2006.01) |
| ***F04B 23/04*** | (2006.01) |
| ***F17C 3/00*** | (2006.01) |

(52) U.S. Cl.
CPC .............. *F04B 15/00* (2013.01); *F04B 15/08* (2013.01); *F04B 23/04* (2013.01); *F17C 3/00* (2013.01); *F17C 13/00* (2013.01); *F17C 13/004* (2013.01); *F04B 2015/081* (2013.01); *F17C 2201/0157* (2013.01); *F17C 2201/052* (2013.01); *F17C 2203/013* (2013.01); *F17C 2203/0333* (2013.01); *F17C 2203/0629* (2013.01); *F17C 2205/0379* (2013.01); *F17C 2221/033* (2013.01); *F17C 2223/0161* (2013.01); *F17C 2223/033* (2013.01); *F17C 2227/0135* (2013.01); *F17C 2227/0178* (2013.01); *F17C 2270/011* (2013.01); *F17C 2270/0105* (2013.01); *F17C 2270/0115* (2013.01)

(58) Field of Classification Search
CPC ...... F17C 2227/0135; F17C 2227/0178; F17C 2201/0157; F17C 2203/013; F17C 13/004; F04B 2015/081; B63B 27/24
See application file for complete search history.

(56) References Cited

U.S. PATENT DOCUMENTS

| | | | | |
|---|---|---|---|---|
| 4,921,380 | A * | 5/1990 | Tronetti, Jr. | .......... F16B 31/028 411/12 |
| 5,640,918 | A | 6/1997 | Moe et al. | |
| 2008/0053993 | A1 * | 3/2008 | Yang | ...................... B63B 25/16 220/4.12 |
| 2011/0006093 | A1 | 1/2011 | Jonas | |

FOREIGN PATENT DOCUMENTS

| | | | |
|---|---|---|---|
| JP | 7-247503 | A | 9/1995 |
| JP | H07247503 | A * | 9/1995 |
| KR | 20-0452608 | Y1 | 3/2011 |
| KR | 101291655 | B1 * | 2/2012 |
| KR | 10-2013-0033003 | A | 4/2013 |
| KR | 20130033003 | A * | 4/2013 |
| KR | 10-1273923 | B1 | 6/2013 |
| KR | 10-1422505 | B1 | 7/2014 |
| WO | 2012/026479 | A1 | 3/2012 |

OTHER PUBLICATIONS

International Search Report dated Nov. 19, 2015 of PCT/KR2015/008233 which is the parent application and its English translation—4 pages.

Examination Report of corresponding Australian Patent Application No. 2015299827—9 pages, (dated Jun. 20, 2018).

* cited by examiner

Prior Art

PUMP TOWER OF LIQUEFIED GAS STORAGE TANK

TECHNICAL FIELD

The present invention relates to a pump tower disposed inside a liquefied gas storage tank to supply and discharge liquefied gas to and from the liquefied gas storage tank.

BACKGROUND ART

In recent years, the consumption of natural gas, which is a clean fuel with less environmental pollution than petroleum or coal, has been rapidly increasing worldwide. Natural gas can be carried in a gaseous phase via onshore or offshore gas piping, or can be stored in a liquefied state in a liquefied gas carrier and transported to a remote source of demand.

For example, liquefied gas such as liquefied natural gas (LNG) or liquefied petroleum gas (LPG) is obtained by cooling natural gas or petroleum gas to a very low temperature (about −163° C., in the case of LNG) and is much more suitable for storage and transportation because the volume thereof is significantly lower than in a gaseous state.

Liquefied gas carriers such as LNG carriers are designed to carry liquefied gas to an onshore source of demand and, for this purpose, include a storage tank (commonly referred to as ‘cargo tank’) that is capable of withstanding ultra-low temperatures of the liquefied gas. In addition to LNG carriers, examples of an offshore structure provided with such a storage tank capable of storing liquefied gas under cryogenic conditions may include ships such as LNG RVs (regasification vessels) and plants such as LNG FSRUs (floating storage and regasification units), LNG FPSOs (floating production, storage and off-loadings), BMPPs (barge mounted power plant), and FSPPs (floating storage power plant).

An LNG RV is an LNG regasification facility installed on an LNG carrier capable of self-propulsion and floating. An LNG FSRU is a marine structure that stores LNG unloaded from an LNG carrier offshore at sea in a storage tank and regasifies LNG and supplies the regasified LNG to an onshore source of demand on demand, and an LNG FPSO is a marine structure that refines extracted natural gas at sea, liquefies the natural gas and stores the liquefied natural gas in a storage tank, and transfers the LNG from the storage tank to an LNG carrier on demand. A BMPP is a marine structure that produces electricity at sea by installing a power generation unit installed on a barge, and an FSPP is a marine plant that produces electricity by installing a power generation unit and a storage tank on a floating structure.

Such marine structures which transport or store a liquid cargo such as LNG, such as LNG carriers, LNG RVs, LNG FPSOs, LNG FSRUs, BMPPs, and FSPPs are equipped with a storage tank for storing LNG, which is a liquid cargo, under cryogenic conditions.

Such a storage tank is divided into an independent-type and a membrane-type depending on whether the weight of cargo is directly applied to an insulator. Typically, the membrane-type storage tank is divided into a GT NO 96-type and a TGZ Mark III-type, and the independent-type storage tank is divided into an MOSS-type and an IHI-SPB-type.

Referring to FIG. 1, a pump tower 20 is disposed inside a storage tank 10, particularly in the vicinity of a front wall 12 of the storage tank 10 to supply liquefied gas to the storage tank 10 or to discharge liquefied gas from the storage tank 10. The pump tower 20 is a large structure with a height of about 30 m for a typical liquefied gas carrier, although the height depends on the size of the liquefied gas storage tank 10.

A conventional pump tower 20 is formed in a substantially triangular column shape to withstand the flow of liquefied gas due to movement of a ship during sailing. Pipes 21, 22, 23 are disposed at respective corners of the triangular column to form a substantially triangular shape in plan view, and stiffeners 25 are interposed between the pipes 21, 22, 23 to connect and reinforce the pipes.

More specifically, as shown in FIG. 2, three pipes forming a substantially triangular shape include two discharge pipes 21, 22 each provided at a lower end thereof with a discharge pump (not shown) to discharge liquefied gas from the storage tank 10 and one emergency pipe 23 provided at a lower end thereof with an emergency pump (not shown). In addition to these three pipes, a filling pipe 24 for supplying liquefied gas into the storage tank 10 is further provided adjacent to the emergency pipe 23.

The pump tower 20 has an upper end suspended from the top of the storage tank 10 and is not directly secured to a bottom of the storage tank so as to cope with dimensional change due to thermal deformation of the storage tank 10. A lower end of the pump tower 20 is connected to a support disposed on a bottom of the storage tank 10 such that only the horizontal movement of the pump tower is restricted by the support, and vertical displacement of the pump tower is possible.

Since, due to shaking of a hull, flow of stored fluid, and the like, an external force is applied to the pump tower 20 in various directions, it is necessary to continuously study a support that can stably support the lower end of the pump tower, which is not secured.

DISCLOSURE

Technical Problem

It is an aspect of the present invention to provide a pump tower of a liquefied gas storage tank which can be stably supported by a support with only an upper end of the pump tower secured to the top of the storage tank even when a lower end of the pump tower is shaken like a pendulum by external force or rotated due to twisting of the pump tower.

Technical Solution

In accordance with one aspect of the present invention, there is provided a pump tower disposed inside a liquefied gas storage tank to supply and discharge liquefied gas to and from the liquefied gas storage tank and including: a discharge pipe provided at a lower end thereof with a discharge pump and discharging liquefied gas from the liquefied gas storage tank; an emergency pipe provided at a lower end thereof with an emergency pump; a filling pipe supplying liquefied gas into the liquefied gas storage tank; a stiffener connecting the discharge pipe, the emergency pipe, and the filling pipe to one another; and a support disposed on a bottom of the liquefied gas storage tank to restrict horizontal movement and rotation of the pump tower while permitting vertical displacement of the pump tower, wherein the support includes a lower body secured to a hull, an upper body secured to the pump tower, and a wedge member interposed between the lower body and the upper body.

The lower body may include a first lower body mounted on a bottom surface of the hull and a second lower body extending upwards from the first lower body.

The first lower body may be embedded in a heat insulating and sealing barrier of the liquefied gas storage tank.

The first lower body and the second lower body may be hollow and at least one of the first lower body and the second lower body may be filled with an insulator.

The first lower body may be stably secured to the bottom surface by a plurality of radially extending ribs.

Alternatively, the first lower body may have a hollow frustoconical shape and may be filled with an insulator.

The upper body may include an inclined surface to have a shape with a wide top and a narrow bottom.

The second lower body may be inserted into the upper body and the wedge member may be interposed between the second lower body and the upper body.

The wedge member may be narrow at one side and wider at the other side and may be interposed between the lower body and the upper body such that the narrower side faces downwards.

The pump tower may further include a lid member coupled to the upper body to prevent detachment of the wedge member and to push the wedge member in a direction in which the wedge member is inserted between the upper body and the lower body.

The lid member may be coupled to the upper body by a bolt and a nut, and a spring washer may be interposed between a head of the bolt and the lid member.

The discharge pipe, the emergency pipe, and the filling pipe may be arranged in a quadrangular prism shape.

The discharge pipe, the emergency pipe, and the filling pipe may be connected to one another through the stiffener.

The stiffener may extend horizontally.

The stiffener may be disposed on a horizontal plane in a group of four to form a square with the discharge pipe, the emergency pipe, and the filling pipe as vertexes and four stiffeners as sides.

In accordance with another aspect of the present invention, there is provided a pump tower disposed inside a liquefied gas storage tank to supply and discharge liquefied gas to and from the liquefied gas storage tank and including: a rotation preventing support mounted on a bottom of the liquefied gas storage tank to restrict rotation of the pump tower while permitting vertical displacement of the pump tower; and a horizontal movement preventing support mounted on a bottom of the liquefied gas storage tank to restrict horizontal displacement of the pump tower while permitting vertical displacement of the pump tower, wherein each of the rotation preventing support and the horizontal movement preventing support includes a lower body secured to a hull, an upper body secured to the pump tower, and a wedge member interposed between the lower body and the upper body.

The lower body of the rotation preventing support may include a first lower body mounted on a bottom surface of the hull and having the same height as a sealing and insulating barrier of the liquefied gas storage tank and a second lower body extending from the first lower body.

The first lower body may have a cylindrical shape and the second lower body may have a quadrangular tube shape.

The first lower body may have a frustoconical shape and the second lower body may have a cylindrical shape with flat surfaces facing each other.

The upper body of the rotation preventing support may include right and left inclined surfaces to have a quadrangular tube shape with a wide top and a narrow bottom.

The second lower body may be inserted into the upper body of the rotation preventing support and the wedge member may be elastically pushed in a direction in which the wedge member is inserted between the right and left inclined surfaces and the second lower body.

The lower body of the horizontal movement preventing support may include a first lower body mounted on a bottom surface of the hull and having the same height as a sealing and insulating barrier of the liquefied gas storage tank and a second lower body extending from the first lower body.

The first lower body and the second lower body may have a cylindrical shape.

Alternatively, the first lower body may have a frustoconical shape and the second lower body may have a cylindrical shape.

The upper body of the horizontal movement preventing support may include an inclined inner circumferential surface to have a frustoconical shape with a wide top and a narrow bottom.

The second lower body may be inserted into the upper body of the horizontal movement preventing support, and the wedge member may be elastically pushed in a direction in which the wedge member is inserted between the inclined inner circumferential surface and the second lower body.

The wedge member may include a plurality of wedge members arranged in a circular shape at predetermined intervals.

A lid member may be coupled to an upper end of the upper body by a bolt and a nut to prevent detachment of the wedge members and the bolt may be interposed between the wedge members such that a space between the wedge members can be maintained.

In accordance with a further aspect of the present invention, there is provided a liquefied gas storage tank, including: a sealing and insulating barrier provided to prevent leakage of stored liquefied gas and to block heat transfer from the outside; a pump tower comprising pipes used to discharge liquefied gas from the liquefied gas storage tank or to supply liquefied gas into the liquefied gas storage tank; and a liquid dome formed above the liquefied gas storage tank to allow the pump tower to be secured thereto; wherein the pump tower includes a support disposed on a bottom of the liquefied gas storage tank to restrict horizontal movement and rotation of the pump tower while permitting vertical displacement of the pump tower, and wherein the support includes a lower body secured to a hull, an upper body secured to the pump tower, and a wedge member interposed between the lower body and the upper body.

Advantageous Effects

According to the present invention, a pump tower of a liquefied gas storage tank can be stably supported by a support with only an upper end of the pump tower secured to the top of the storage tank even when a lower end of the pump tower is shaken like a pendulum by external force or rotated due to twisting of the pump tower.

According to the present invention, the pump tower can absorb displacement due to shaking or rotation of the pump tower, thereby reducing stress acting on the pump tower installed inside the liquefied gas storage tank in a suspended manner.

EMBODIMENTS

Hereinafter, embodiments of the present invention will be described in more detail with reference to the accompanying drawings. However, it should be understood that these examples are provided for illustration only and are not to be construed in any way as limiting the present invention.

Figure 1:
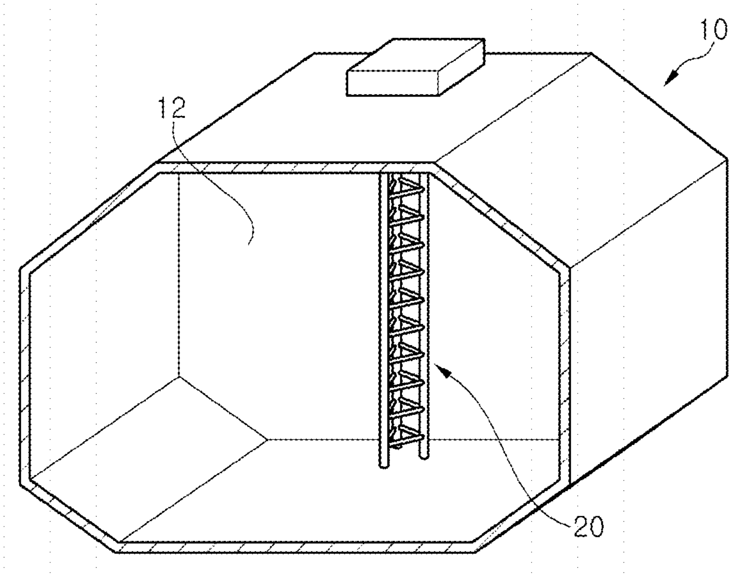
FIG. 1 is a partial perspective view of a liquefied gas storage tank provided with a conventional pump tower.
Figure 2:
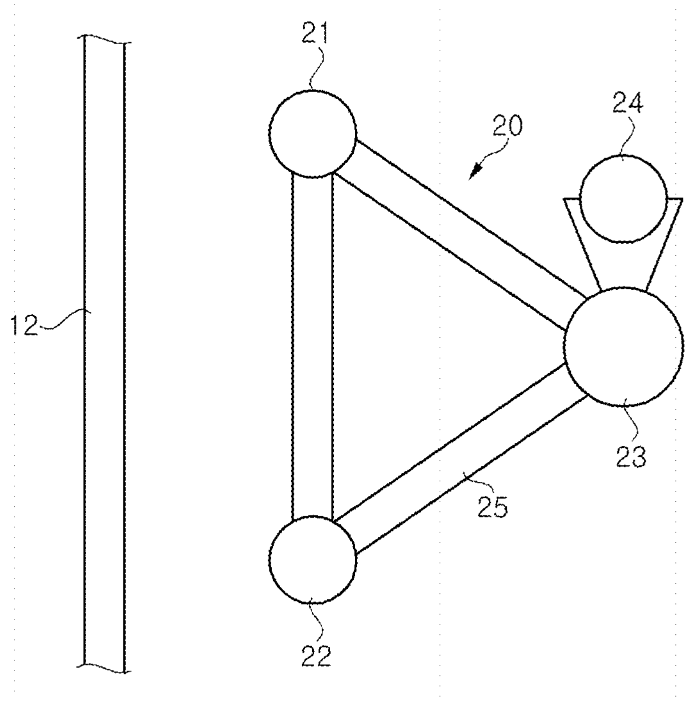
Prior Art Fig. 2
FIG. 2 is a partial plan sectional view of a liquefied gas storage tank provided with a conventional pump tower.
Figure 3:
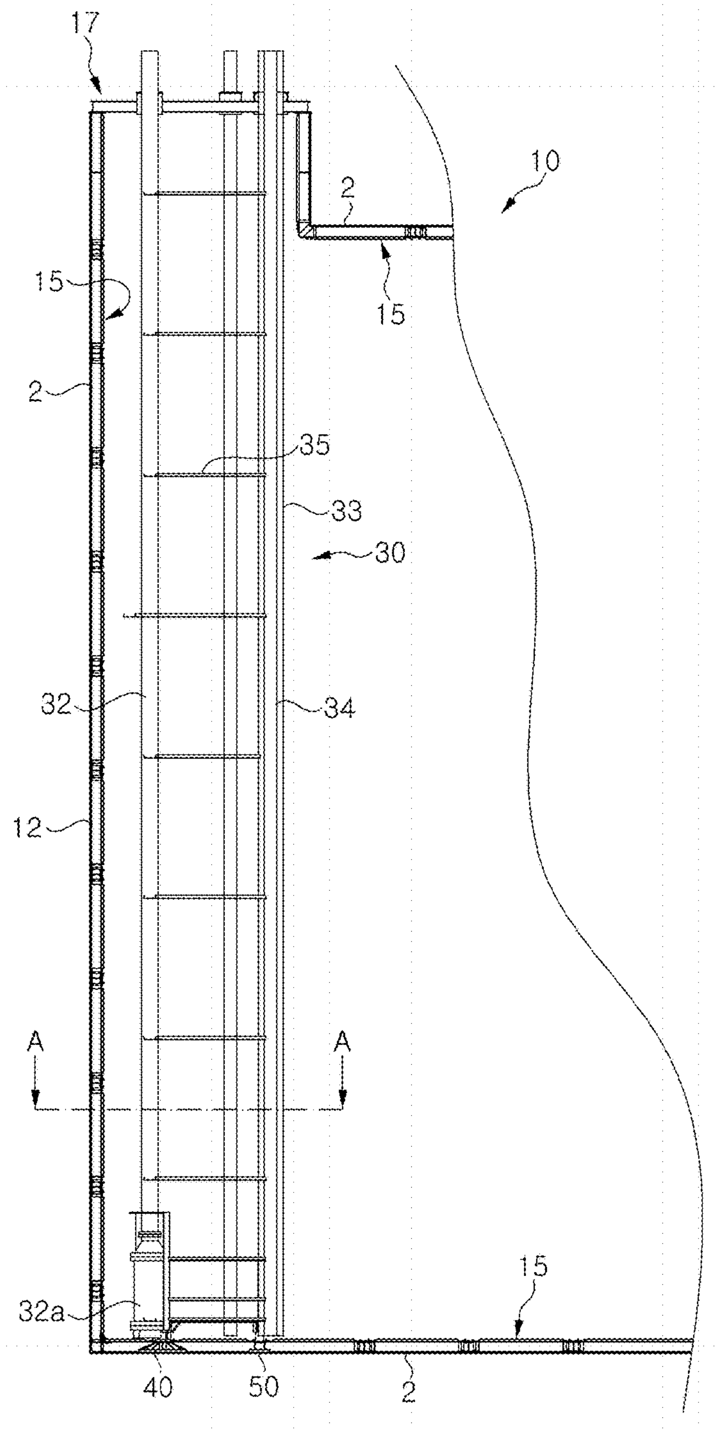
FIG. 3 is a partial side sectional view of a liquefied gas storage tank provided with a pump tower according to a first embodiment of the present invention.
Figure 4:
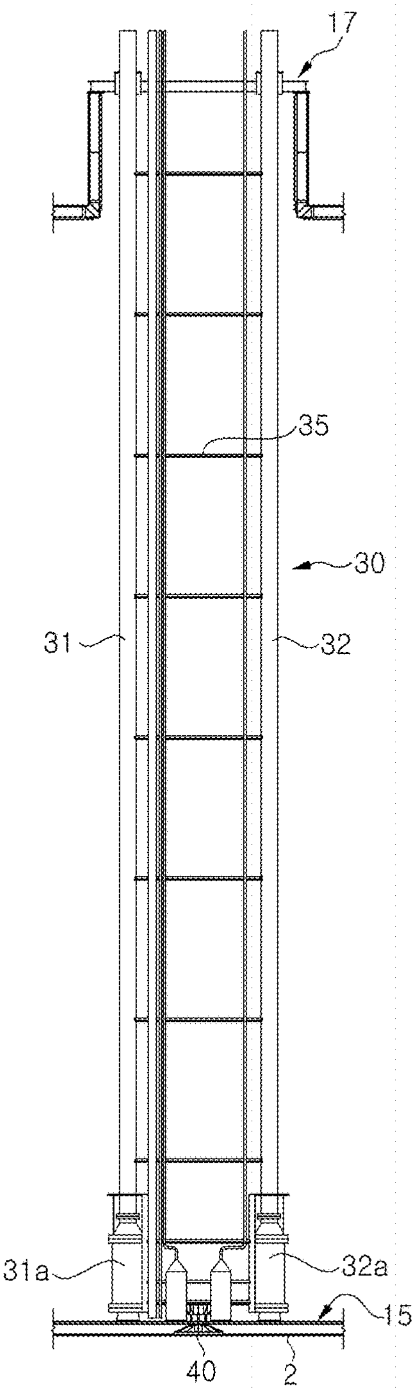
FIG. 4 is a partial front sectional view of the liquefied gas storage tank provided with the pump tower according to the first embodiment of the present invention.

FIGS. 3 and 4 are a side sectional view and a front sectional view partially showing a portion of a liquefied gas storage tank provided with a pump tower according to an embodiment of the present invention, that is, a portion of the liquefied gas storage tank at which the pump tower is disposed, respectively. Specifically, FIG. 3 is a view of a portion of the liquefied gas storage tank at which the pump tower is disposed, viewed from the port side of a hull, and FIG. 4 is a view of the portion of the liquefied gas storage tank at which the pump tower is disposed, viewed from the front of the hull.

Figure 5:
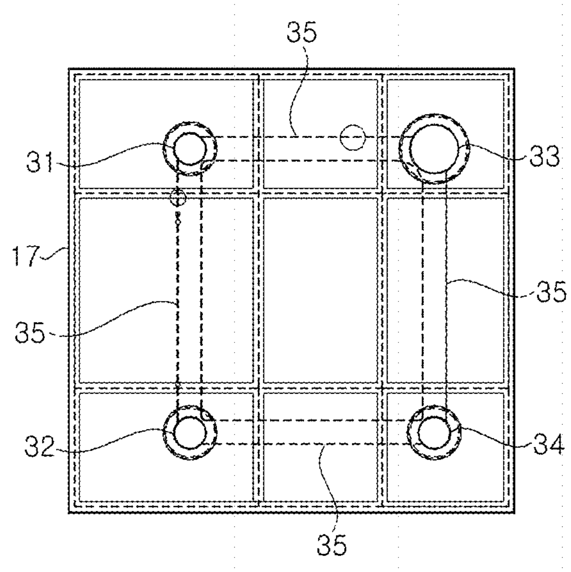
FIG. 5 is a plan view of a liquid dome of the liquefied gas storage tank provided with the pump tower according to the first embodiment of the present invention.
Figure 6:
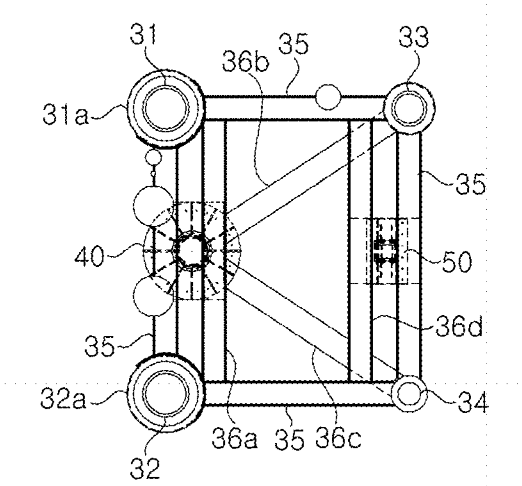
FIG. 6 is a plan sectional view of the pump tower according to the first embodiment of the present invention.

FIG. 5 is a partial plan view of a liquid dome of a liquefied gas storage tank provided with a pump tower according to an embodiment of the present invention, and FIG. 6 is a plan sectional view of a pump tower according to an embodiment of the present invention, taken along line A-A of FIG. 3.

The liquefied gas storage tank 10 may be used to store a liquid cargo containing a hydrocarbon component that is liquefied at an ultra-low temperature, such as LNG or LPG. In addition, the liquefied gas storage tank 10 may be an independent storage tank or a membrane-type storage tank having a sealing and insulating barrier to store an ultra-low temperature liquid cargo such as LNG. Although the liquefied gas storage tank 10 shown in FIGS. 3 and 4 is exemplified as a membrane-type tank manufactured by installing a sealing and insulating barrier 15 on an inner surface of a hull (i.e., an inner surface of an inner wall 2, which is mounted to the hull to form a storage tank), it should be understood that the present invention is not limited thereto.

The sealing and insulating barrier 15 is installed on an inner wall of the storage tank 10 over all directions, that is, on a front wall, a rear wall, a left wall, a right wall, an upper wall, and a lower wall so as to prevent leakage of liquefied gas stored in the storage tank 10 and to block heat transfer from the outside.

The liquefied gas storage tank 10 provided with the pump tower 30 according to the embodiment may be installed inside a hull of an offshore structure. As used herein, the term "offshore structure" refers to offshore plants such as LNG FPSOs (LNG floating production, storage and off-loadings), oil FPSO, LNG FSRUs (LNG floating storage and regasification units), LNG FRUs (LNG floating and regasification units), BMPPs (barge mounted power plants), and FSPPs (floating storage power plants), in addition to ships such as various liquefied gas carriers including LNG carriers or LNG RVs (LNG regasification vessels).

Referring to FIGS. 3 to 6, the pump tower 30 according to the embodiment of the present invention has a quadrangular prism shape in which four pipes are arranged at respective corners.

Referring to FIGS. 5 and 6, the pump tower 30 having a substantially quadrangular prism shape includes two discharge pipes 31, 32 provided at respective lower ends thereof with discharge pumps 31*a*, 32*a* and discharging liquefied gas from the storage tank 10, one emergency pipe provided at a lower end thereof with an emergency pump (not shown), and a filling pipe 34 for supplying liquefied gas into the storage tank 10, wherein the pipes are disposed at corners of the pump tower, respectively. The pipes 31, 32, 33, 34 are connected to one another through respective stiffeners 35 extending in the horizontal direction.

An upper end of the pump tower 30 according to the embodiment is secured to a liquid dome 17, and a lower end of the pump tower is restricted from being moved and rotated in the horizontal direction by a horizontal movement preventing support 40 and a rotation preventing support 50, but is not restricted from being moved in a vertical direction. Since the lower end of the pump tower 30 is not fixedly mounted on a bottom of the storage tank 10, as described above, the pump tower is allowed to be thermally deformed due to storage and discharge of liquefied gas and changed in overall length thereof.

Since the upper end of the pump tower 30 is secured to the liquid dome 17 as described above, the expression "the pump tower moves in the horizontal direction" means that the lower end of the pump tower is shaken like a pendulum due to deformation of the storage tank or flow of the liquefied gas, and the expression "the pump tower rotates" means that the lower end of the pump tower is rotated while the upper end of the pump tower is secured, causing the pump tower to twist.

In addition to the aforementioned pipes, a sampling pipe installed to extract some of the liquefied gas and analyze components of the liquefied gas or various cableways for electrical devices may be attached to the pump tower 30. Since these are well known to those skilled in the art, detailed description thereof will be omitted.

The stiffener 35 has a shape in which the height is smaller than the width so as to minimize the flow resistance upon flow of liquefied gas stored in the liquefied gas storage tank 10. In addition, according to the embodiment of the invention, the stiffener 35 only extends in the horizontal direction to connect the pipes 31, 32, 33, 34 and is not installed obliquely. By omitting a stiffener installed in an oblique direction, the flow resistance of liquefied gas applied to the pump tower can be minimized.

In order to connect the pipes 31, 32, 33, 34, one stiffener 35 is interposed between the two pipes such that a set of four stiffeners 35 forms a square with four pipes as vertexes and four stiffeners 35 as sides in plan view, as shown in FIGS. 5 and 6. That is, the four stiffeners 35 are attached in a substantially horizontal plane.

The stiffeners may be installed more tightly at a lower portion of the pump tower 30 for strength reinforcement and cooperation with the horizontal movement preventing support 40 and the rotation preventing support 50.

For example, as shown in FIG. 6, the pump tower 30 is provided at the lower portion thereof with a first transverse stiffener 36*a*, which horizontally extends in a transverse direction of the pump tower and with first and second radial stiffeners 36*b*, 36*c*, which radially extend from the horizontal movement preventing support 40 in a horizontal direction in order to cooperate with the horizontal movement preventing support 40, which is disposed at the bottom of the liquefied gas storage tank 10 to prevent horizontal movement of the pump tower 30.

In addition, for example, the pump tower 30 is provided at the lower portion thereof with a second transverse stiffener 36*d* horizontally extending in the transverse direction of the pump tower in order to cooperate with the rotation preventing support 50 provided at the bottom of the liquefied gas storage tank 10 to prevent the pump tower 30 from rotating about the horizontal movement preventing support 40.

As described with reference to FIGS. 3 to 6, the pump tower 30 according to the embodiment has a structure in which a total of four pipes 21, 22, 23, 24 is arranged in a substantially quadrangular shape in plan view and thus has a quadrangular prism shape. Accordingly, since the flow passage area when the liquefied gas flows in the right and left directions of the hull is not significantly different from the flow passage area when the liquefied gas flows in the forward and backward directions of the hull, it is possible to prevent a large flow load from acting on the pump tower when the liquefied gas flows in a specific direction.

Further, even when the flow direction of the liquefied gas changes, since the flow load applied to the pump tower can be maintained at a substantially constant level, it is not necessary to reinforce the pump tower more than necessary considering the maximum flow load. Accordingly, even with a small number of stiffeners connecting the pipes forming the pump tower to reinforce the pump tower, a required level of strength can be secured.

Next, with reference to FIGS. 7 to 11, the following description will be given of the configuration and operation of a horizontal movement preventing support 40 and a rotation preventing support 50 according to a first embodiment of the present invention, which are provided to restrict horizontal movement and rotation of a pump tower 30 with an upper end thereof secured to a storage tank 10.

Figure 7:
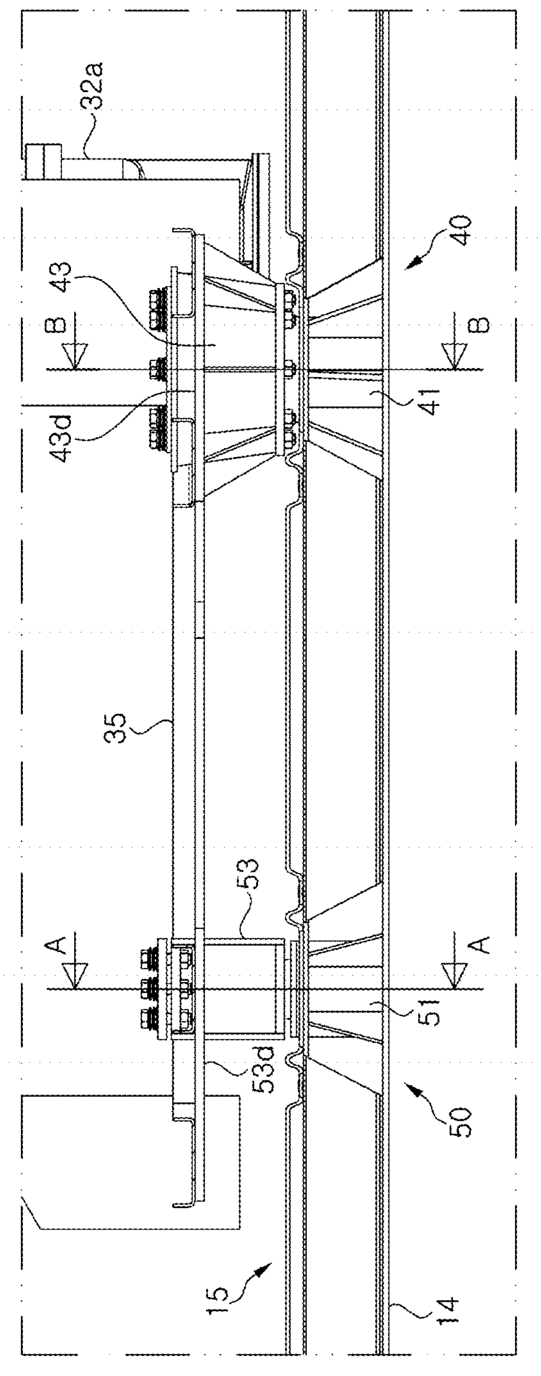
FIG. 7 is a side view of a portion of a lower part of the pump tower according to the first embodiment of the present invention.
Figure 8:
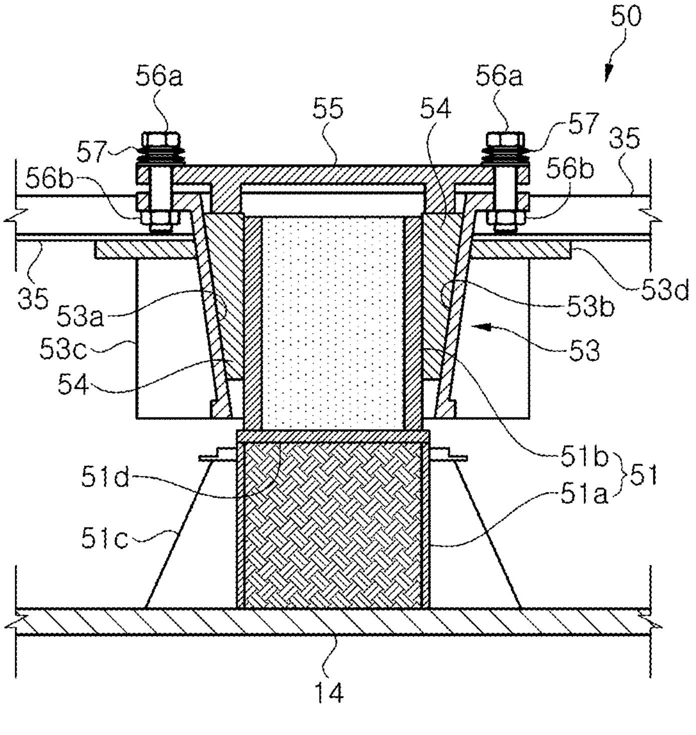
FIG. 8 is a sectional view of a rotation preventing support according to a first embodiment of the present invention, taken along line A-A of FIG. 7.
Figure 9:
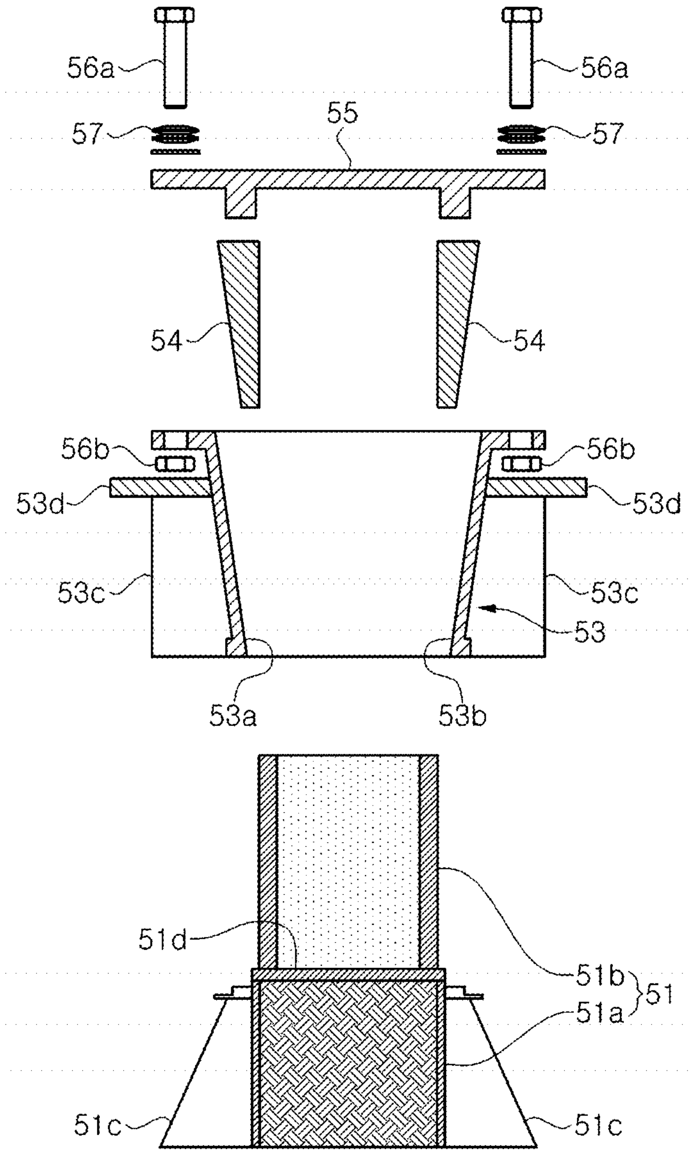
FIG. 9 is an exploded view of the rotation preventing support of FIG. 8.
Figure 10:
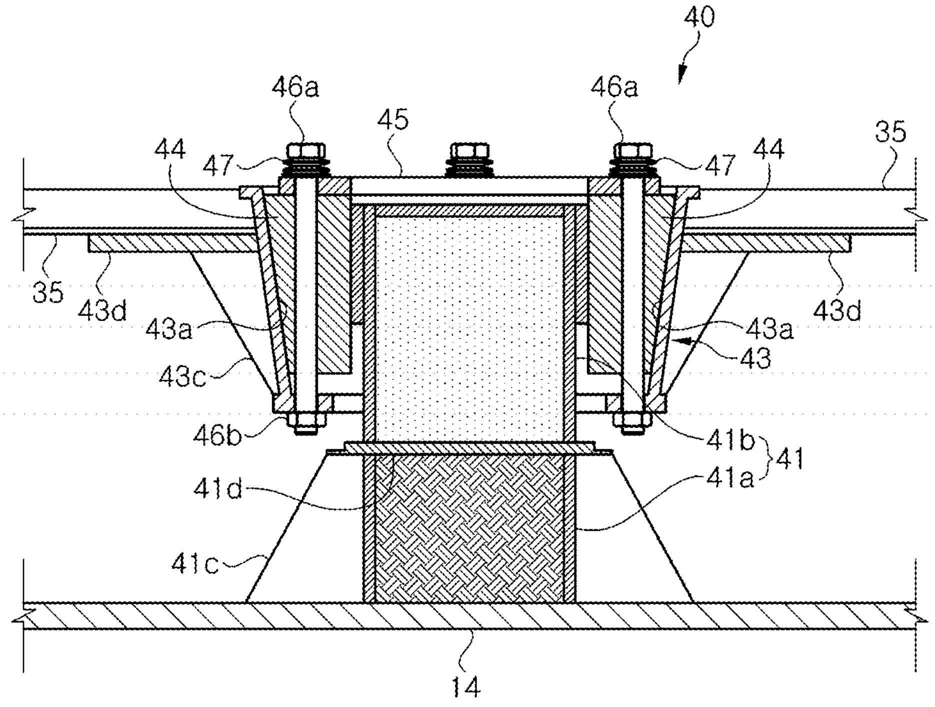
FIG. 10 is a sectional view of a horizontal movement preventing support according to a first embodiment of the present invention, taken along line B-B of FIG. 7.
Figure 11:
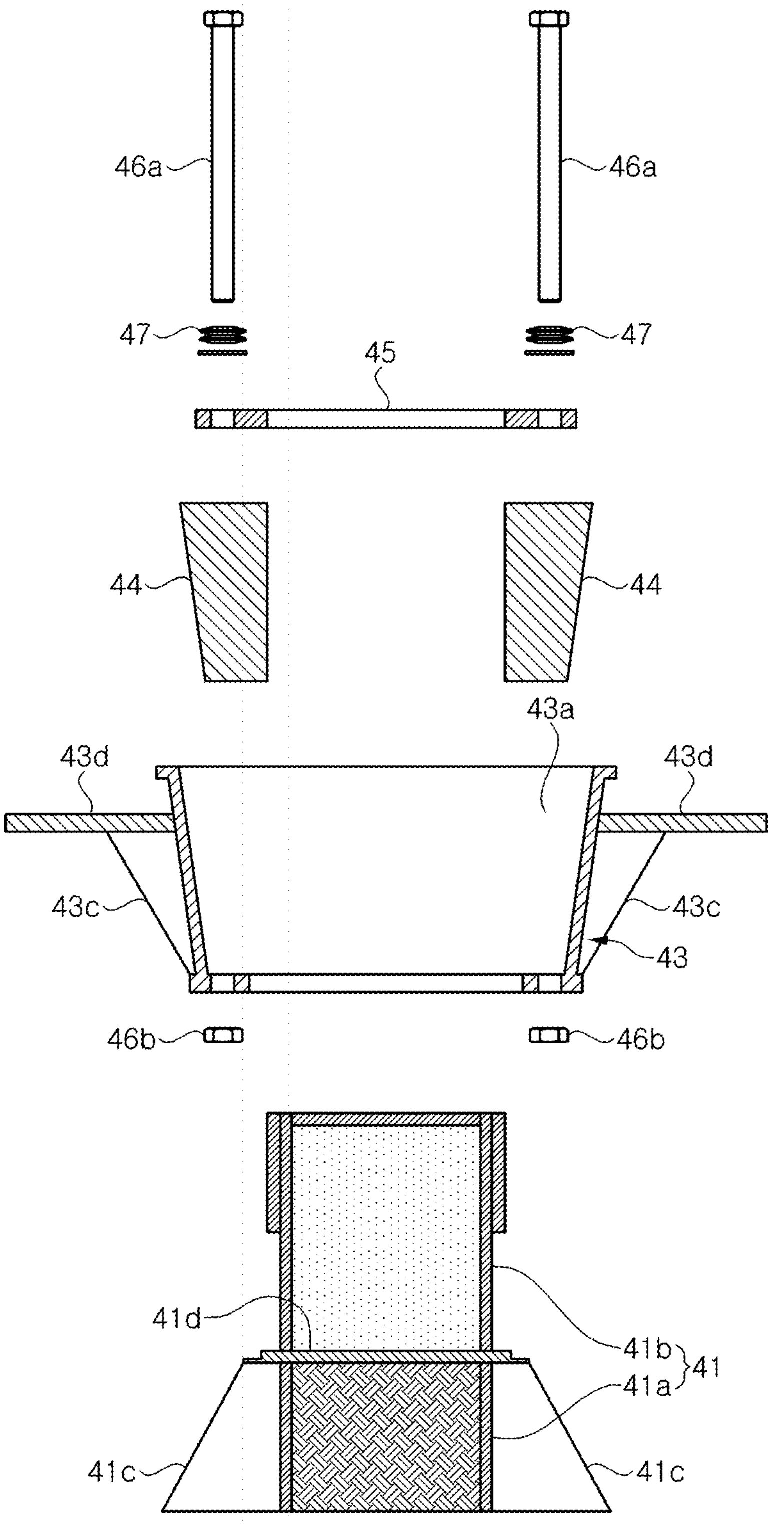
FIG. 11 is an exploded view of the horizontal movement preventing support of FIG. 10.

FIG. 7 is a side view partially showing a lower portion of the pump tower where the horizontal movement preventing support 40 and the rotation preventing support 50 according to the first embodiment are disposed. FIGS. 8 and 9 are a sectional view and an exploded view of the rotation preventing support 50 according to the first embodiment, respectively, and FIGS. 10 and 11 are a sectional view and an exploded view, respectively, of the horizontal movement preventing support 40 according to the first embodiment.

As described above, the lower end of the pump tower 30 is not fixedly mounted on the bottom of the storage tank 10 such that the pump tower is allowed to be thermally deformed due to storage and discharge of liquefied gas and changed in overall length thereof. As used herein, the expression "the pump tower moves in the horizontal direction" means that the lower end of the pump tower is shaken like a pendulum due to deformation of the storage tank or sloshing of the liquefied gas, and the expression "the pump tower rotates" means that the lower end of the pump tower is rotated while the upper end of the pump tower is secured, causing the pump tower to twist.

Referring to FIG. 7, which shows a lower portion of the pump tower viewed from the starboard side, the horizontal movement preventing support 40 and the rotation preventing support 50 are installed on a bottom surface 14 constituting the hull through the sealing and insulating barrier 15 of the storage tank 10. In addition, referring to FIG. 3, which shows the pump tower viewed from the port side, the horizontal movement preventing support 40 is closer to the stem than the rotation preventing support 50.

Referring to FIGS. 8 and 9, the rotation preventing support 50 according to the first embodiment includes a lower body 51 securely mounted on a bottom surface 14 constituting a portion of the hull, an upper body 53 securely mounted on the pump tower 30, and wedge members 54 interposed between the upper body 53 and the lower body 51.

The lower body 51 of the rotation preventing support 50 may have, for example, a hollow cylindrical shape and may be filled with an insulator. More specifically, the lower body 51 may include a first hollow lower body 51*a* directly mounted on the bottom surface 14 of the hull and having substantially the same height as the sealing and thermal barrier 15 of the storage tank and a second hollow lower body 51*b* extending upwards from the first lower body 51*a*.

The interior of the first lower body 51*a* may be filled with an insulator such as glass wool, and the interior of the second lower body 51*b* may be filled with an insulator such as polyurethane foam. The first lower body 51*a* may have a substantially cylindrical shape and the second lower body 51*b* may have a substantially quadrangular tube shape to prevent rotation of the pump tower. The first lower body 51*a* may be more stably secured to the bottom surface 14, which is a hull structure, through a plurality of radially extending ribs 51*c*. A partition 51*d* may be interposed between the first lower body 51*a* and the second lower body 51*b* such that the respective inner spaces do not communicate with each other.

The upper body 53 of the rotation preventing support 50 has, for example, a quadrangular tube shape, and right and left inclined surfaces 53*a*, 53*b* are formed on the right and left sides of the upper body 53 such that the upper body has trapezoidal shape with a wide top and a narrower bottom when viewed from the bow or stern of the hull, as shown in FIGS. 8 and 9.

The upper body 53 is secured to the pump tower 30 to be displaced together with the pump tower 30. The upper body 53 may be secured to a stiffener disposed at the lower end of the pump tower 30 (for example, a horizontal stiffener 35, a second transverse stiffener 36*d*, and the like) by welding or the like so as to be secured to the pump tower 30. The upper body 53 can be more stably secured to the pump tower 30 using a plurality of ribs 53*c*.

According to this embodiment, the upper body 53 may be indirectly secured to the stiffener of the pump tower 30 through a connecting member 53*d*. It should be understood that the upper body 53 may also be directly secured to the pump tower 30 without using the connecting member 53*d*. Alternatively, the upper body 53 may be directly secured to the pump tower 30 while being indirectly secured to the pump tower 30 via the connecting member 53*d* so as to be more firmly secured to the pump tower.

A portion of the second lower body 51*b* of the lower body 51 may be inserted into the upper body 53. The wedge member 54 is interposed between each of the right and right inclined surfaces 53*a*, 53*b* of the upper body 53 and the second lower body 51*b* of the lower body 51. The wedge members 54 have a shape with a narrow bottom and a wide top.

A lid member 55 is coupled to an upper end of the upper body 53 to prevent detachment of the wedge members 54 through an upper opening of the upper body 53 and to push the wedge members 54 in a direction in which the wedge members 54 are inserted between the upper body 53 and the lower body 51. The lid member 55 may have a substantially quadrangular plate shape.

The lid member 55 may be coupled to the upper body 53 by bolts 56*a* and nuts 56*b*, and, for this purpose, the upper body 53 may be formed at an upper end thereof with a flange. After the bolts 56*a* are completely fastened to the nuts 56*b*, the nuts 56*b* may be attached to the bolts 56*a* by, for example, welding.

A spring washer 57 may be interposed between a head of the bolt 56*a* and the lid member 55. Although the spring washer 57 is used to improve reliability in a cryogenic environment in this embodiment, it should be understood that the spring washers 57 may be replaced by other members having elasticity.

Since the rotation preventing support 50 according to this embodiment has a structure in which the wedge members 54 are interposed between the lower body 51 secured to the hull and the upper body 53 secured to the pump tower 30, the locations of the wedge members 54 can be changed so as to cope with change in the distance between the lower body 51 and the upper body 53 due to thermal deformation or horizontal movement and rotation of the pump tower 30. In other words, when the gap between the lower body 51 and the upper body 53 is widened, the wedge member 54 moves downwards, and, when the gap between the lower body 51 and the upper body 53 becomes narrow, the wedge members 54 move upwards, whereby horizontal displacement of the pump tower 30, for example, rotation of the pump tower, can be regulated while permitting vertical displacement of the pump tower 30.

Further, although the wedge members 54 are pushed by the lid member 55, the lid member elastically pushes the wedge members 54 through the spring washers 57. Accordingly, the lid member does not interfere with the displacement of the wedge members 54.

With reference to FIGS. 10 and 11, the following description will be given of the configuration and operation of the horizontal movement preventing support 40 according to the first embodiment of the present invention. The horizontal movement preventing support 40 according to this embodiment is somewhat different in shape from the rotation preventing support 50 set forth above, but is similar to the rotation preventing support in terms of operation principle and action.

Referring to FIGS. 10 and 11, the horizontal movement preventing support 40 according to the first embodiment includes a lower body 41 securely mounted on a bottom surface 14 constituting a portion of the hull, an upper body 43 securely mounted on the pump tower 30, and a wedge member 44 interposed between the upper body 43 and the lower body 41.

The lower body 41 of the horizontal movement preventing support 50 may have, for example, a hollow cylindrical shape and may be filled with an insulator. More specifically, the lower body 41 may include a first hollow lower body 41*a* directly mounted on the bottom surface 14 of the hull and having substantially the same height as the sealing and thermal barrier 15 of the storage tank and a second hollow lower body 41*b* extending upwards from the first lower body 41*a*.

The interior of the first lower body 41*a* may be filled with an insulator such as glass wool, and the interior of the second lower body 41*b* may be filled with an insulator such as polyurethane foam. The first lower body 41*a* and the second lower body 41*b* may have a substantially cylindrical shape. Since the horizontal movement preventing support 40 is provided to prevent horizontal movement of the pump tower in all directions, the second lower body 41*b* and the upper body 43 of the horizontal movement preventing support 40 have a substantially cylindrical shape, unlike the second lower body 51*b* and the upper body 53 of the rotation preventing support 50 having a substantially quadrangular tube shape. The first lower body 41*a* may be more stably secured to the bottom surface 14, which is a hull structure, through a plurality of radially extending ribs 41*c*. A partition 41*d* may be interposed between the first lower body 41*a* and the second lower body 41*b* such that the respective inner spaces do not communicate with each other.

The upper body 43 of the horizontal movement preventing support 40 has, for example, a cylindrical shape, and is formed with an inclined inner circumferential surface 43*a* so as to have a frustoconical shape with a wide upper portion and a narrow lower portion when viewed from the side, as shown in FIGS. 10 and 11.

The upper body 43 is secured to the pump tower 30 to be displaced together with the pump tower 30. The upper body 43 may be secured to a stiffener disposed at the lower end of the pump tower 30 (for example, a horizontal stiffener 35, a first transverse stiffener 36*a*, and the like) by welding or the like so as to be secured to the pump tower 30. The upper body 43 can be more stably secured to the pump tower 30 using a plurality of ribs 43*c*.

According to this embodiment, the upper body 43 may be indirectly secured to the stiffener of the pump tower 30 through a connecting member 43*d*. It should be understood that the upper body 43 may also be directly secured to the pump tower 30 without using the connecting member 43*d*. Alternatively, the upper body 43 may be directly secured to the pump tower 30 while being indirectly secured to the pump tower 30 via the connecting member 43*d* so as to be more firmly secured to the pump tower.

A portion of the second lower body 41*b* of the lower body 41 may be inserted into the upper body 43. The wedge members 44 are interposed between the inner circumferential surface 43*a* of the upper body 43 and the second lower body 41*b* of the lower body 41. The wedge member 44 is tapered toward the lower end and has a curved shape so as to be interposed between the inner circumferential surface 43*a* of the upper body 43 and the second lower body 41*b* of the lower body 41, which are substantially circular.

For the rotation preventing support 50, one wedge member 54 is placed on each of the left and right sides, whereas, for the horizontal movement preventing support 40, a plurality of wedge members 44 are arranged in a circular shape at predetermined intervals. For example, eight wedge members 44 having the same curvature may be arranged in a circular shape.

A lid member 45 is coupled to an upper end of the upper body 43 to prevent detachment of the wedge members 44 through an upper opening of the upper body 43 and to push the wedge members 44 in a direction in which the wedge members 44 are inserted between the upper body 43 and the lower body 41. The lid member 45 may have a substantially ring shape.

The lid member 45 may be coupled to the upper body 43 by bolts 46_a_ and nuts 46_b_, and, for this purpose, the upper body 43 may be formed at an upper end thereof with a flange. After the bolts 46_a_ are completely fastened to the nuts 46_b_, the nuts 46_b_ may be attached to the bolts 46_a_ by, for example, welding.

The bolts 46_a_ and the wedge members 44 are alternately arranged such that each bolt 46_a_ is placed between the wedge members 44. The bolt 46_a_ may serve to maintain a space between the plural wedge members 44.

A spring washer 47 may be interposed between a head of the bolt 46_a_ and the lid member 45. Although the spring washers 47 are used to improve reliability in a cryogenic environment in this embodiment, it should be understood that the spring washers 47 may be replaced by other members having elasticity.

Since the horizontal movement preventing support 40 according to this embodiment has a structure in which the wedge members 44 are interposed between the lower body 41 secured to the hull and the upper body 43 secured to the pump tower 30, the locations of the wedge members 44 can be changed so as to cope with change in the distance between the lower body 41 and the upper body 43 due to thermal deformation or horizontal movement and rotation of the pump tower 30. In other words, when the gap between the lower body 41 and the upper body 43 is widened, the wedge members 44 move downwards, and, when the gap between the lower body 41 and the upper body 43 becomes narrow, the wedge members 44 move upwards, whereby horizontal displacement of the pump tower 30 can be regulated while permitting vertical displacement of the pump tower 30.

Further, although the wedge members 44 are pushed by the lid member 45, the lid member elastically pushes the wedge members 44 through the spring washers 47. Accordingly, the lid member does not interfere with displacement of the wedge members 44.

With reference to FIGS. 12 to 15, the following description will be given of the configuration and operation of a horizontal movement preventing support 140 and rotation preventing support 150 according to a second embodiment of the present invention, which are provided for restricting the horizontal movement and rotation of the pump tower 30 with an upper end thereof secured to the storage tank 10.

Figure 12:
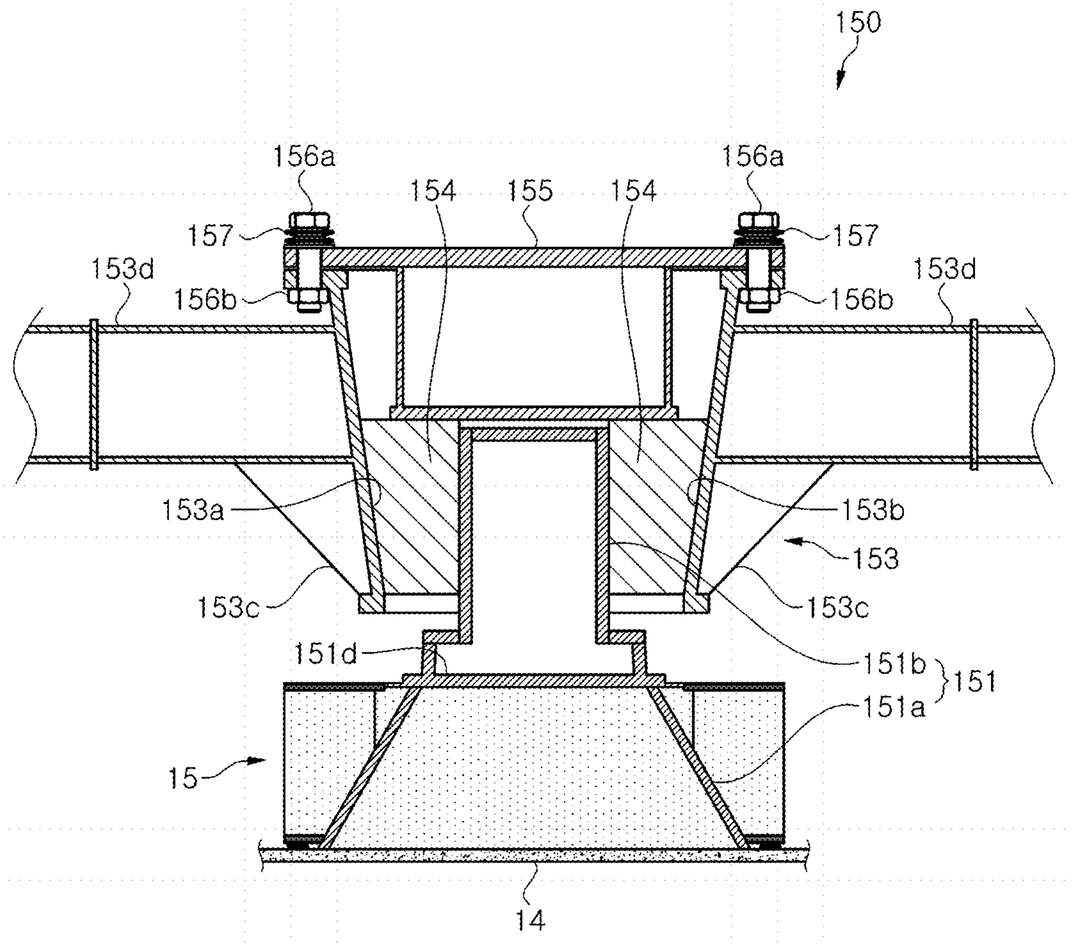
FIG. 12 is a sectional view of a rotation preventing support according to a second embodiment of the present invention.
Figure 13:
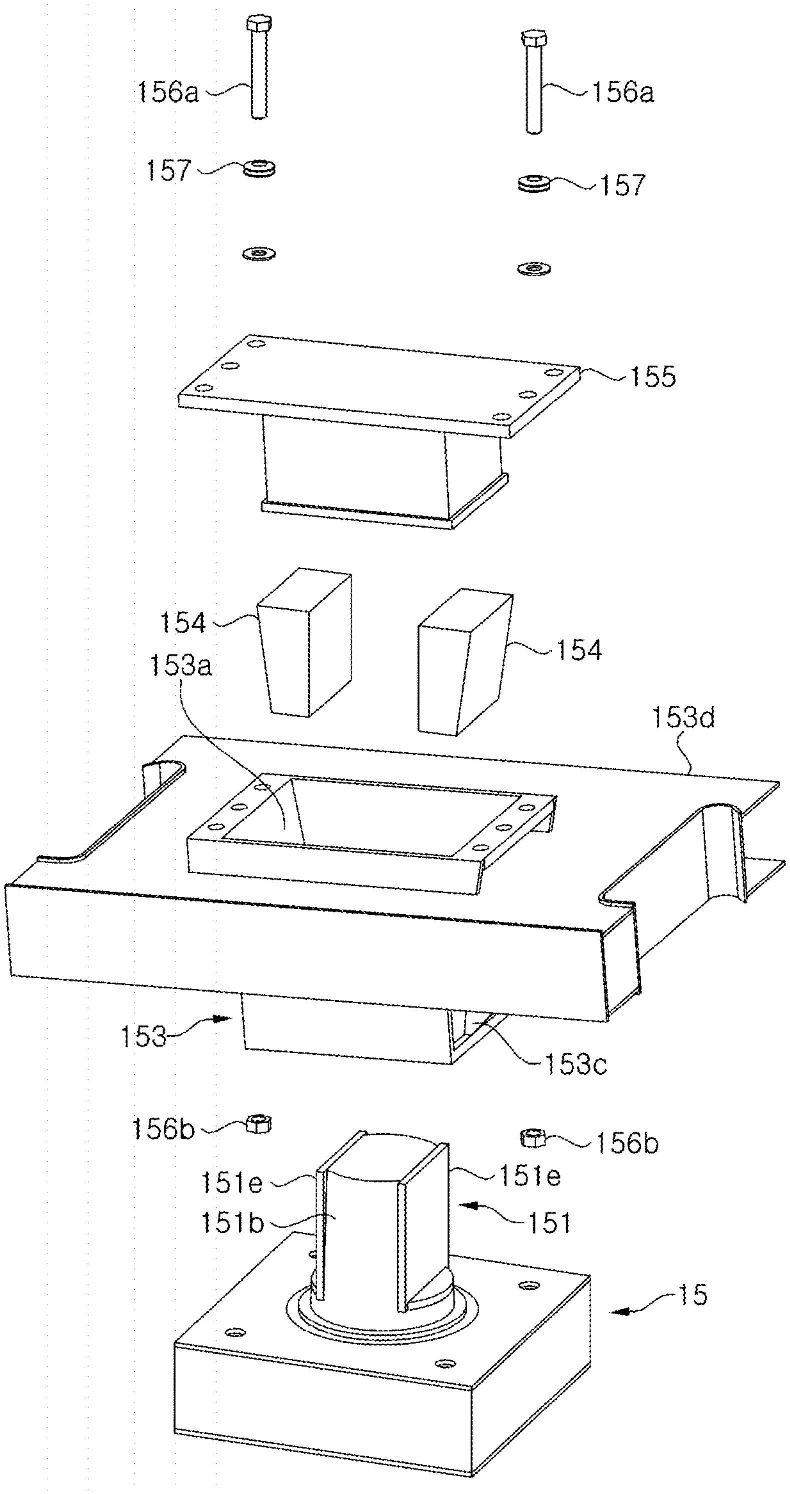
FIG. 13 is an exploded view of the rotation preventing support of FIG. 12.
Figure 14:
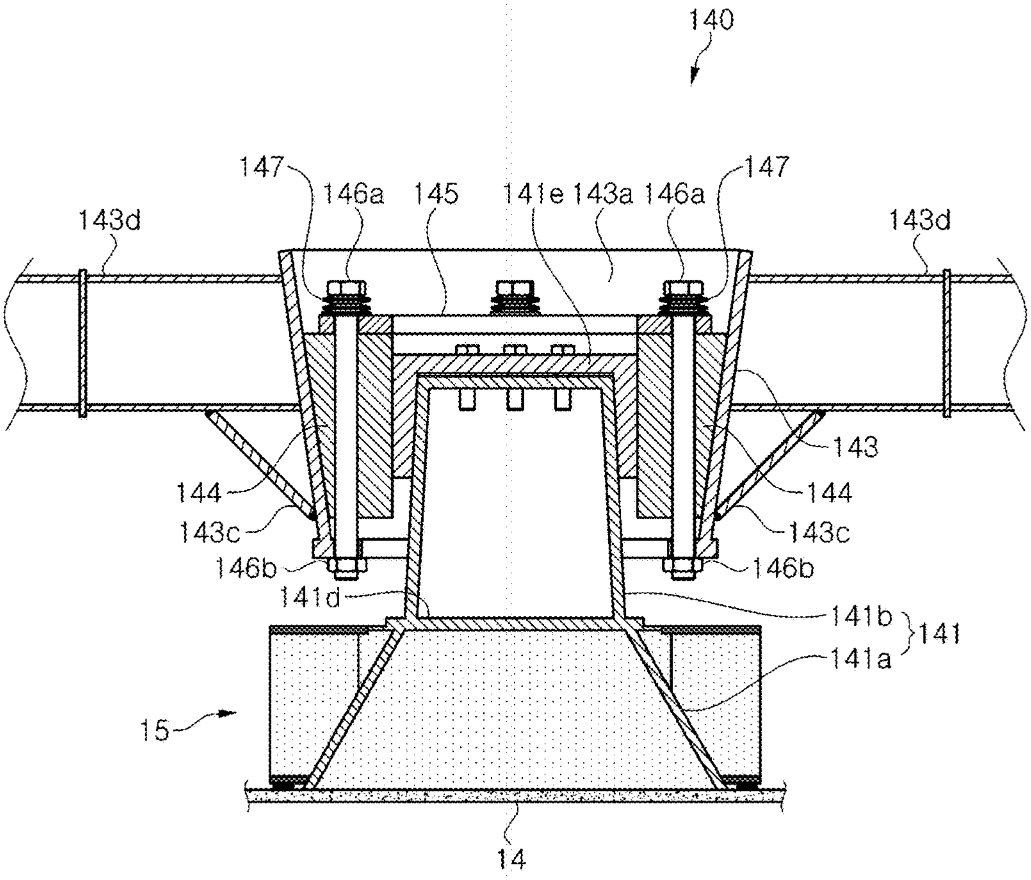
FIG. 14 is a sectional view of a horizontal movement preventing support according to a second embodiment of the present invention.
Figure 15:
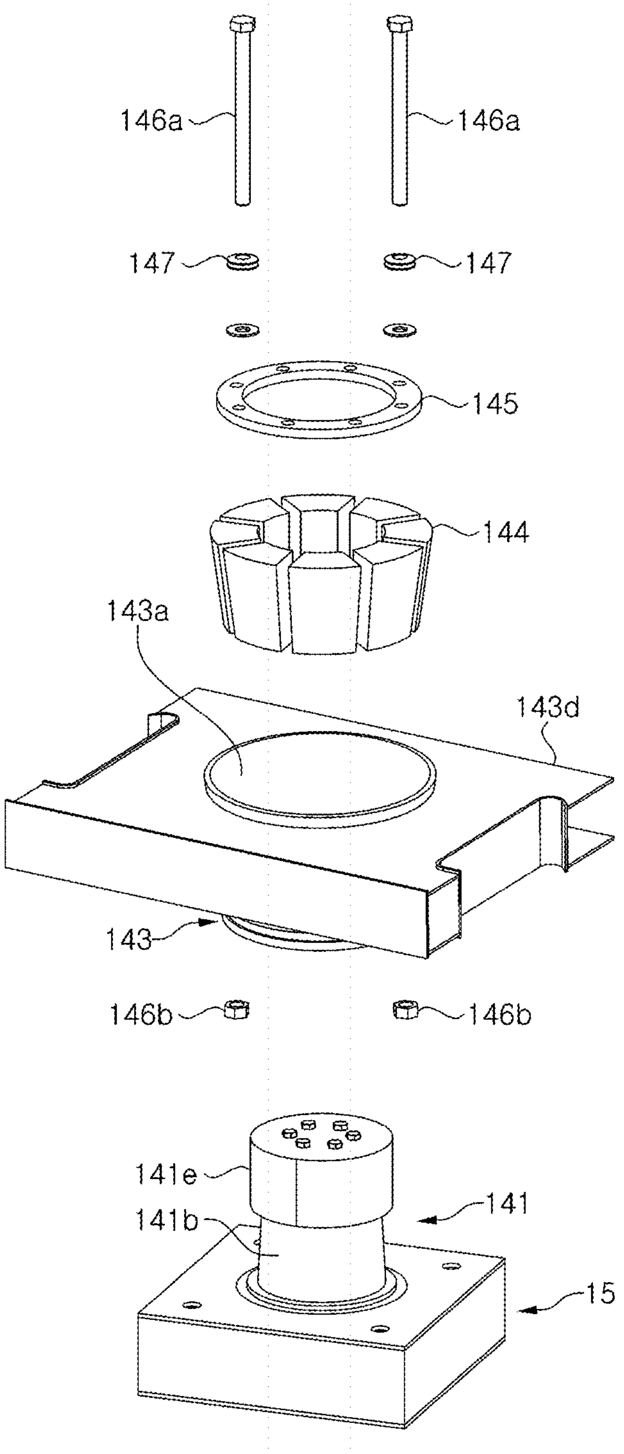
FIG. 15 is an exploded view of the horizontal movement preventing support of FIG. 14.

FIGS. 12 and 13 are a sectional view and an exploded view of a rotation preventing support 150 according to a second embodiment of the present invention, respectively, and FIGS. 14 and 15 are a sectional view and an exploded view of a horizontal movement preventing support 140 according to a second embodiment of the present invention, respectively.

Referring to FIGS. 12 and 13, the rotation preventing support 150 according to the second embodiment includes a lower body 151 securely mounted on a bottom surface 14 constituting a portion of the hull, an upper body 153 securely mounted on the pump tower 30, and wedge members 154 interposed between the upper body 153 and the lower body 151, as in the first embodiment described above.

The lower body 151 of the rotation preventing support 150 may have, for example, a hollow cone shape, and the interior thereof may be filled with an insulator. More specifically, the lower body 151 may include a first hollow lower body 151_a_ directly mounted on the bottom surface 14 of the hull and having substantially the same height as the sealing and thermal barrier 15 of the storage tank and a second hollow lower body 151_b_ extending upwards from the first lower body 151_a_.

The first lower body 151_a_ may have a substantially frustoconical shape and the interior of the first lower body 151_a_ may be filled with an insulator such as glass wool. The second lower body 151_b_ may have a substantially cylindrical shape having a pair of flat side surfaces and the interior of the second lower body 151_b_ may be filled with an insulator such as polyurethane foam. Alternatively, the interior of the second lower body 151_b_ may be empty without an insulator.

The wedge member 154 adjoins each of the flat side surfaces of the second lower body 151_b_ and a protection member 151_e_ may be attached to a portion of the flat side surfaces abutting the wedge member 154 to protect the portion and to provide lubrication. A partition 151_d_ may be interposed between the first lower body 151_a_ and the second lower body 151_b_ such that the respective inner spaces do not communicate with each other.

For the rotation preventing support 50 according to the first embodiment described above, the first lower body 51_a_ can be more stably secured to the bottom surface 14, which is a hull structure, by the plurality of radially extending ribs 51_c_, whereas, for the rotation preventing support 150 according to the second embodiment, the first lower body 151_a_ has a frustoconical shape and thus can be stably secured to the bottom surface 14.

The upper body 153 of the rotation preventing support 150 has, for example, a quadrangular tube shape, and right and left inclined surfaces 153_a_, 153_b_ are formed on the right and left sides of the upper body 153 such that the upper body has trapezoidal shape with a wide top and a narrow bottom when viewed from the stem or stern of the hull, as shown in FIG. 12.

The upper body 153 is secured to the pump tower 30 to be displaced together with the pump tower 30. The upper body 153 may be secured to the pump tower 30 through a connecting member 153_d_, as shown in FIGS. 12 and 13. Although the upper body 153 may be indirectly secured to the pump tower 30 through the connecting member 153_d_, as shown in the drawings, the upper body 153 may also be directly secured to the pump tower 30 without using the connecting member 153_d_. Alternatively, the upper body 153 may be directly secured to the pump tower 30 while being indirectly secured to the pump tower 30 via the connecting member 153_d_ so as to be more firmly secured to the pump tower.

A portion of the second lower body 151_b_ of the lower body 151 may be inserted into the upper body 153. The wedge member 154 is interposed between each of the left and right inclined surfaces 153_a_, 153_b_ of the upper body 153 and the second lower body 151_b_ of the lower body 151. The wedge members 154 have a shape with a narrow bottom and a wide top.

A lid member 155 is coupled to an upper end of the upper body 153 to prevent detachment of the wedge members 154 through an upper opening of the upper body 153 and to push the wedge members 154 in a direction in which the wedge member 154 is inserted between the upper body 153 and the lower body 151. The lid member 155 may have a substantially quadrangular plate shape.

The lid member 155 may be coupled to the upper body 153 through bolt 156*a* and nuts 156*b*, and, for this purpose, the upper body 153 may be formed at an upper end thereof with a flange. After the bolts 156*a* are completely fastened to the nuts 156*b*, the nuts 156*b* may be attached to the bolts 156*a* by, for example, welding.

A spring washer 157 may be interposed between a head of the bolt 156*a* and the lid member 155. Although the spring washers 157 are used to improve reliability in a cryogenic environment in this embodiment, it should be understood that the spring washers 157 can be replaced by other members having elasticity.

Since the rotation preventing support 150 according to this embodiment has a structure in which the wedge members 154 are interposed between the lower body 151 secured to the hull and the upper body 153 secured to the pump tower 30, the locations of the wedge members 154 can be changed so as to cope with change in the distance between the lower body 151 and the upper body 153 due to thermal deformation or horizontal movement and rotation of the pump tower 30. In other words, when the gap between the lower body 151 and the upper body 153 is widened, the wedge members 154 move downwards, and, when the gap between the lower body 151 and the upper body 153 becomes narrow, the wedge members 154 move upwards, whereby horizontal displacement of the pump tower 30, for example, rotation of the pump tower, can be regulated while permitting vertical displacement of the pump tower 30.

Further, although the wedge members 154 are pushed by the lid member 155, the lid member elastically pushes the wedge members 154 through the spring washers 157. Accordingly, the lid member does not interfere with displacement of the wedge members 154.

Next, the configuration and operation of the horizontal movement preventing support 140 according to the second embodiment of the present invention will be described with reference to FIGS. 14 and 15. The horizontal movement preventing support 140 according to this embodiment is slightly different in shape from the rotation preventing support 150 as set forth above, and is similar to the rotation preventing support in terms of operation principle and action.

Referring to FIGS. 14 and 15, the horizontal movement preventing support 140 according to the second embodiment includes a lower body 141 securely mounted on a bottom surface 14 constituting a portion of the hull, an upper body 143 securely mounted on the pump tower 30, and wedge members 144 interposed between the upper body 143 and the lower body 141.

The lower body 141 of the horizontal movement preventing support 140 may have, for example, a hollow cone shape, and the interior thereof may be filled with an insulator. More specifically, the lower body 141 may include a first hollow lower body 141*a* directly mounted on the bottom surface 14 of the hull and having substantially the same height as the sealing and thermal barrier 15 of the storage tank and a second hollow lower body 141*b* extending upwards from the first lower body 141*a*.

The first lower body 141*a* may have a substantially frustoconical shape, and the interior of the first lower body 141*a* may be filled with an insulator such as glass wool. The second lower body 141*b* may have a substantially cylindrical shape, and the interior of the second lower body 141*b* may be filled with an insulator such as polyurethane foam. Alternatively, the interior of the second lower body 141*b* may be empty.

Since the horizontal movement preventing support 140 is provided to prevent horizontal movement of the pump tower in all directions, the second lower body 141*b* and the upper body 143 of the horizontal movement preventing support 140 have a substantially cylindrical shape, unlike the second lower body 151*b* of the rotation preventing support 150 having a flat surface and the upper body 153 having a substantially quadrangular tube shape.

For the horizontal movement preventing support 40 according to the first embodiment described above, the first lower body 41*a* can be more stably secured to the bottom surface 14, which is a hull structure, by the plurality of radially extending ribs 41*c*, whereas, for the horizontal movement preventing support 140 according to the second embodiment, the first lower body 141*a* has a frustoconical shape and thus can be stably secured to the bottom surface 14.

As described below, a plurality of wedge members 144 is arranged in a circular shape on an outer circumferential surface of the second lower body 141*b* to abut the surface, and a protection member 151*e* may be attached to a portion of the surface abutting the wedge members 154 to protect the portion and to provide lubrication. The protection member 141*e* may have a substantially cylindrical shape with an upper portion thereof closed to cover the second lower body 141*b*. The protective member 141*e* may be coupled to the second lower body 141*b* by a fastening member such as a bolt. A partition 141*d* may be interposed between the first lower body 141*a* and the second lower body 141*b* such that the respective inner spaces do not communicate with each other.

The upper body 143 of the horizontal movement preventing support 140 has, for example, a cylindrical shape, and is formed with an inclined inner circumferential surface 143*a* so as to have a frustoconical shape with a wide upper portion and a narrow lower portion when viewed from the side, as shown in FIG. 14.

The upper body 143 is secured to the pump tower 30 to be displaced together with the pump tower 30. The upper body 143 may be secured to the pump tower 30 through a connecting member 143*d*, as shown in FIGS. 14 and 15. Although the upper body 143 may be indirectly secured to the pump tower 30 through the connecting member 143*d*, as shown in the drawings, the upper body 143 may also be directly secured to the pump tower 30 without using the connecting member 143*d*. Alternatively, the upper body 143 may be directly secured to the pump tower 30 while being indirectly secured to the pump tower 30 via the connecting member 143*d* so as to be more firmly secured to the pump tower.

The upper body 143 can be more stably secured to the connecting member 143*d* by a stiffener 143*c* having a frustoconical shape with a wide upper portion and a narrow lower portion.

A portion of the second lower body 141*b* of the lower body 141 may be inserted into the upper body 143. The wedge members 144 are interposed between the inner circumferential surface 143*a* of the upper body 143 and the second lower body 141*b* of the lower body 141. The wedge member 144 is tapered toward the lower end and has a curved shape to be interposed between the inner circumferential surface 143*a* of the upper body 143 and the second lower body 141*b* of the lower body 141, which are substantially circular.

For the rotation preventing support 150, one wedge member 154 is placed on each of the left and right sides, whereas, for the horizontal movement preventing support 140, a plurality of wedge members 144 are arranged in a circular shape at predetermined intervals. For example, eight wedge members 144 having the same curvature may be arranged in a circular shape.

A lid member 145 is coupled to an upper end of the upper body 143 to prevent detachment of the wedge members 144 through an upper opening of the upper body 143 and to push the wedge members 144 in a direction in which the wedge members 144 are inserted between the upper body 143 and the lower body 141. The lid member 145 may have a substantially ring shape.

The lid member 145 and the upper body 143 may be coupled to each other by bolts 146*a* and nuts 146*b* with the wedge members 144 interposed therebetween, and, for this purpose, the upper body 143 may be formed at an upper end thereof with a flange. After the bolts 146*a* are completely fastened to the nuts 146*b*, the nuts 146*b* may be attached to the bolts 146*a* by, for example, welding.

Although only two bolts 146*a*, two nuts 146*b*, and two spring washers 147 are shown in FIG. 15 for convenience of illustration, the number of bolts 146*a*, nuts 146*b*, and spring washers 147 should be equal to the number of wedge members 144.

The bolt 146*a* and the wedge member 144 are alternately arranged such that one bolt 146*a* is placed between the wedge members 144. The bolt 146*a* may serve to maintain the spacing between the plurality of wedge members 144.

A spring washer 147 may be interposed between a head of the bolt 146*a* and the lid member 145. Although the spring washers 147 are used to improve reliability in a cryogenic environment in this embodiment, it should be understood that the spring washers 147 may be replaced by other members having elasticity.

Since the horizontal movement preventing support 140 according to this embodiment has a structure in which the wedge members 144 are interposed between the lower body 141 secured to the hull and the upper body 143 secured to the pump tower 30, the locations of the wedge members 144 can be changed so as to cope with change in the distance between the lower body 141 and the upper body 143 due to thermal deformation or horizontal movement and rotation of the pump tower 30. In other words, when the gap between the lower body 141 and the upper body 143 is widened, the wedge members 144 move downwards, and, when the gap between the lower body 141 and the upper body 143 becomes narrow, the wedge members 144 move upwards, whereby horizontal displacement of the pump tower 30 can be regulated while permitting vertical displacement of the pump tower 30.

Further, although the wedge members 144 are pushed by the lid member 145, the lid member elastically pushes the wedge members 144 through the spring washers 147. Accordingly, the lid member does not interfere with displacement of the wedge member 144.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

The invention claimed is:

1. A pump tower disposed inside a liquefied gas storage tank, the pump tower comprising:

a first discharge pipe configured to discharge liquefied gas from the liquefied gas storage tank;

a second discharge pipe configured to discharge liquefied gas from the liquefied gas storage tank;

a filling pipe configured to supply liquefied gas into the liquefied gas storage tank;

a plurality of stiffeners connecting the first discharge pipe, the second discharge pipe, and the filling pipe to one another; and two or more supports configured to restrict horizontal and rotational movement of the pump tower, wherein the two or more supports comprising a first support that comprises a lower body secured to a bottom of the liquid gas storage tank and further comprises an upper body secured to at least one of the plurality of stiffeners, wherein the upper body comprises an inclined inner surface defining a tapered hollow that is tapered toward the bottom, the lower body comprises a post upwardly extending into the tapered hollow, and at least one wedge member is inserted between the post and the inclined inner surface of the upper body such that the upper body and the lower body are engaged with each other while being slidable relative to each other.

2. The pump tower according to claim 1, wherein the lower body comprises a first lower body mounted on the bottom, wherein the post extends upwards from the first lower body, wherein the first lower body is embedded in a heat insulating and sealing barrier of the liquefied gas storage tank.

3. The pump tower according to claim 2, wherein the first lower body and the post are hollow and at least one of the first lower body and the post is filled with an insulator.

4. The pump tower according to claim 2, wherein the first lower body is stably secured to the bottom by a plurality of radially extending ribs.

5. The pump tower according to claim 2, wherein the first lower body has a hollow frustoconical shape and is filled with an insulator.

6. The pump tower according to claim 1, wherein the at least one wedge member is narrower at one side and wider at the other side and is interposed between the lower body and the upper body such that the narrower side faces downwards.

7. The pump tower according to claim 1, further comprising:

a lid member coupled to the upper body to prevent detachment of the at least one wedge member and to push the wedge member in a direction in which the wedge member is inserted between the upper body and the lower body.

8. The pump tower according to claim 7, wherein the lid member is coupled to the upper body by a bolt and a nut, and a spring washer is interposed between a head of the bolt and the lid member.

9. The pump tower according to claim 1, further comprising a third discharge pipe, wherein the first discharge pipe, the second discharge pipe, third discharge pipe and the filling pipe are arranged in a quadrangular prism shape.

10. The pump tower according to claim 9, wherein the plurality of stiffener are disposed on a horizontal plane in a group of four to form a square having the first discharge pipe, the second discharge pipe, the third discharge pipe, and the filling pipe as vertexes and four stiffeners as sides when viewed from over the pump tower.

11. The pump tower according to claim 1, wherein the plurality of stiffener extends horizontally.

12. A pump tower provided a liquefied gas storage tank to supply and discharge liquefied gas to and from the liquefied gas storage tank, the pump tower comprising:

a rotation preventing support mounted on a bottom of the liquefied gas storage tank to restrict rotation of the pump tower while permitting vertical displacement of the pump tower; and a horizontal movement preventing support mounted on a bottom of the liquefied gas storage tank to restrict horizontal displacement of the pump tower while permitting vertical displacement of the pump tower, wherein each of the rotation preventing support and the horizontal movement preventing support comprises a lower body secured to a hull, an upper body secured to the pump tower, and a wedge member interposed between the lower body and the upper body.

13. The pump tower according to claim 12, wherein the lower body of the rotation preventing support comprises a first lower body mounted on a bottom surface of the hull and having the same height as a sealing and insulating barrier of the liquefied gas storage tank and a second lower body extending from the first lower body.

14. The pump tower according to claim 13, wherein the first lower body has a cylindrical shape and the second lower body has a quadrangular tube shape.

15. The pump tower according to claim 13, wherein the first lower body has a frustoconical shape and the second lower body has a cylindrical shape with flat surfaces facing each other.

16. The pump tower according to claim 13, wherein the upper body of the rotation preventing support comprises right and left inclined surfaces to have a quadrangular tube shape with a wide top and a narrow bottom, the second lower body is inserted into the upper body of the rotation preventing support, and the wedge member is elastically pushed in a direction in which the wedge member is inserted between the right and left inclined surfaces and the second lower body.

17. The pump tower according to claim 12, wherein the lower body of the horizontal movement preventing support comprises a first lower body mounted on a bottom surface of the hull and having the same height as a sealing and insulating barrier of the liquefied gas storage tank and a second lower body extending from the first lower body.

18. The pump tower according to claim 17, wherein the first lower body and the second lower body have a cylindrical shape.

19. The pump tower according to claim 17, wherein the first lower body has a frustoconical shape, and the second lower body has a cylindrical shape.

20. The pump tower according to claim 17, wherein the upper body of the horizontal movement preventing support comprises an inclined inner circumferential surface to have a frustoconical shape with a wide top and a narrow bottom, the second lower body is inserted into the upper body of the horizontal movement preventing support, and the wedge member is elastically pushed in a direction in which the wedge member is inserted between the inclined inner circumferential surface and the second lower body.

21. The pump tower according to claim 17, wherein the wedge member comprises a plurality of wedge members arranged in a circular shape at predetermined intervals, a lid member is coupled to an upper end of the upper body by a bolt and a nut to prevent detachment of the wedge member, and the bolt is interposed between the wedge members such that a space between the wedge members is maintained.

22. A liquefied gas storage tank, comprising:

a sealing and insulating barrier configured to prevent leakage of liquefied gas from the liquefied gas storage tank and to block heat transfer from outside;

a pump tower comprising a discharge pipe configured to discharge liquefied gas from the liquefied gas storage tanker and a filling pipe configured to supply liquefied gas into the liquefied gas storage tank; and dome formed over the pump tower, wherein the pump tower is secured to the dome; and two or more supports configured to restrict horizontal and rotational movement of the pump tower, wherein the two or more supports comprising a first support that comprises a lower body secured to a bottom of the liquid gas storage tank and further comprises an upper body secured to at least one of the plurality of stiffeners, wherein the upper body comprises an inclined inner surface defining a tapered hollow that is tapered toward the bottom, the lower body comprises a post upwardly extending into the tapered hollow, and at least one wedge member is inserted between the post and the inclined inner surface of the upper body such that the upper body and the lower body are engaged with each other while being slidable relative to each other.

* * * * *